Jan. 4, 1949.　　　D. C. HILL ET AL　　　2,458,164
GRAVITOMETER

Filed Oct. 25, 1943　　　　　　　　　　2 Sheets—Sheet 1

Inventors
Donald C. Hill
William A. McGlashen

By Lyon & Lyon
Attorneys

Jan. 4, 1949.    D. C. HILL ET AL    2,458,164
GRAVITOMETER
Filed Oct. 25, 1943    2 Sheets-Sheet 2

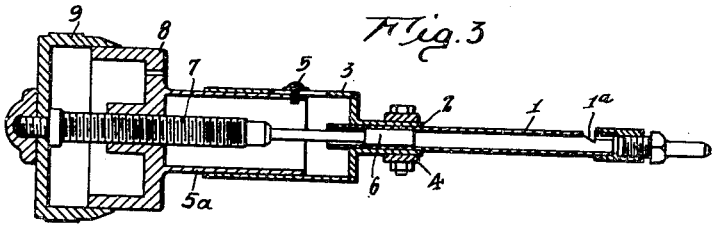
Fig. 3

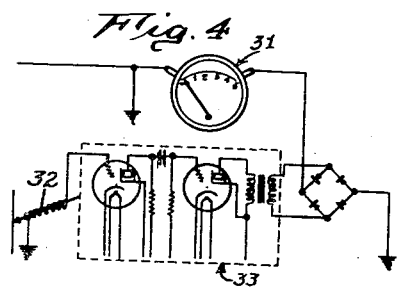
Fig. 4

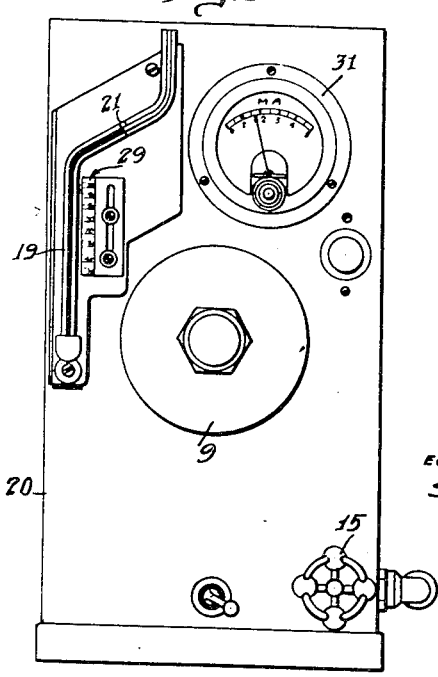
Fig. 5

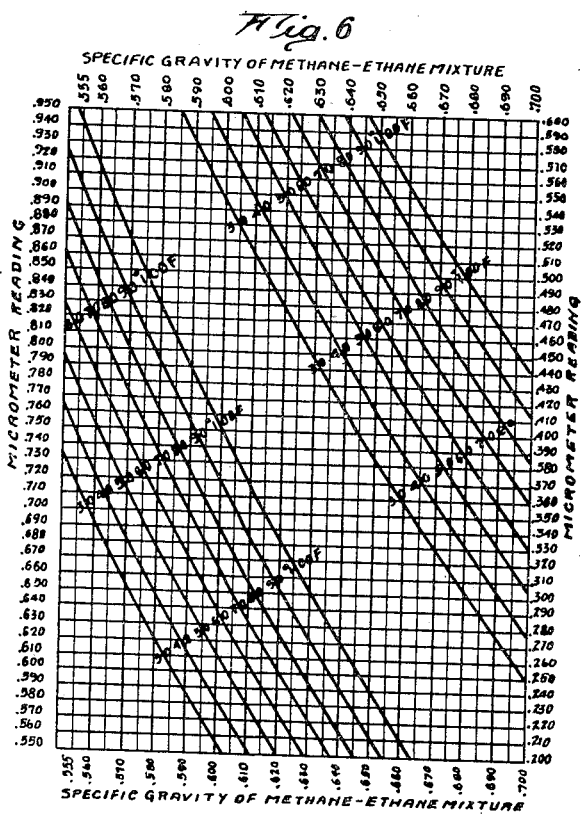
Fig. 6

EQUATION USED:
$$S = \frac{6.0585\,K(460+T)}{520(m+2.9741)^2}$$

IN WHICH: S = SPECIFIC GRAVITY OF GAS (AIR=1)
K = RATIO OF SPECIFIC HEAT OF GAS = $C_p/C_v$
T = GAS TEMPERATURE, °F.
m = MICROMETER READING, INCHES
(m + 2.9741) = TOTAL EFFECTIVE LENGTH OF WHISTLE.

STANDARD GAUGE PRESSURE 2-7/8" WATER AT 60°F
FREQUENCY = 1147 OSCILLATIONS PER SECOND

Inventors
Donald C. Hill
William A. McGlashen
By Lyon & Lyon
Attorneys

Patented Jan. 4, 1949

2,458,164

UNITED STATES PATENT OFFICE 2,458,164

GRAVITOMETER

Donald C. Hill, Los Angeles, and William A. McGlashen, Huntington Park, Calif.

Application October 25, 1943, Serial No. 507,500

11 Claims. (Cl. 73—24)

This invention relates to gravitometers, and more particularly to a method and means of determining the density of a gas or gases. The principle upon which this invention is based is that the frequency or pitch of the sound wave produced by a whistle of fixed length depends on the density of the gas used in producing the sound wave; the lower the density of the gas, the higher the frequency or pitch. Therefore, in accordance with this invention, we make use of this principle in determining the density of gas constituting a single element or mixture of elements by passing the gas through a whistle which is adjustable so that the length of the whistle may be varied to produce a predetermined frequency of sound wave, the reproduction of which is indicated by a resonance or single frequency indicator.

It is therefore an object of this invention to provide a device for determining the density of a gas or gases which employs the foregoing principles.

Another object of this invention is to provide a method for determining the density of a gas by passing the gas through a whistle to produce a sound wave, varying the length of the whistle until the same may be brought to a predetermined frequency of sound wave, and determining the specific gravity of the gas from the effective length of the whistle required to produce the said frequency of sound wave.

Another object of this invention is to provide a method of determining the density of a gas by the use of a single whistle of variable length operative to produce a sound wave of definite frequency or pitch as indicated by a resonance or single frequency indicator.

Other objects and advantages of this invention it is believed will be apparent from the following detailed description of a preferred embodiment thereof as illustrated in the accompanying drawings.

In the drawings:

Figure 3 is an enlarged fragmental sectional elevation of the variable length whistle embodied in our invention.

Figure 4 is a wiring diagram of the resonance or single frequency indicator.

Figure 5 is a front elevation of the gravitometer embodying our invention.

Figure 6 is a diagram of whistle lengths as related to specific gravity of a methane-ethane gas mixture of varying range of temperatures.

Figure 1:
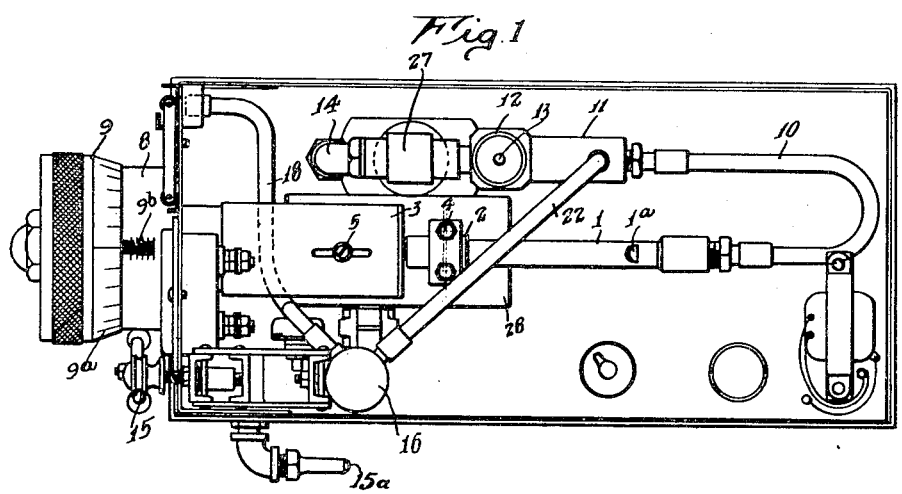
Figure 1 is a top plan view of the gravitometer embodying our invention.
Figure 2:
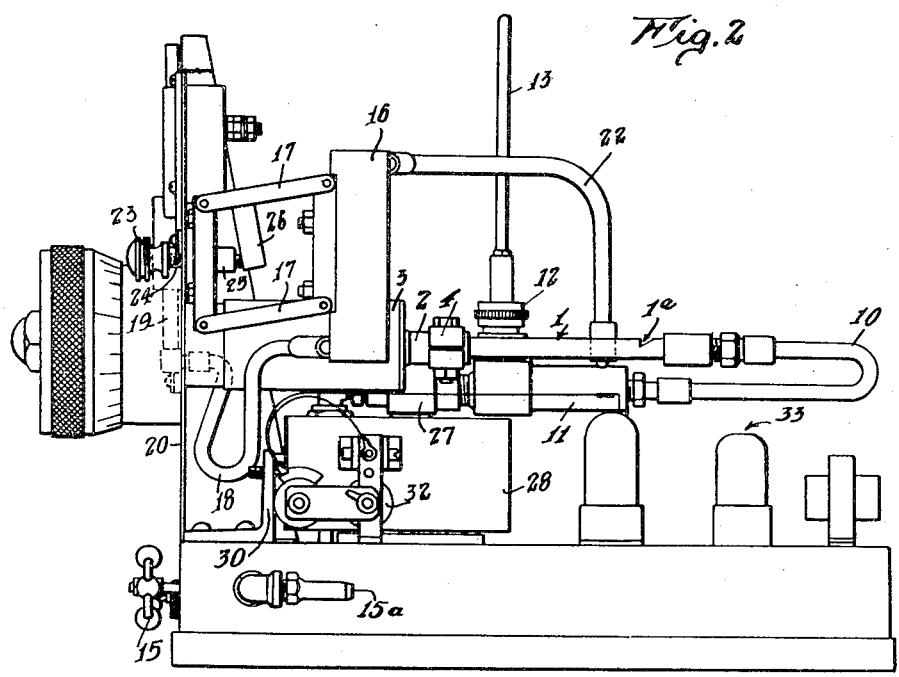
Figure 2 is a side elevation thereof.

As heretofore set forth, the principle upon which this invention is based is that the frequency or pitch of a sound wave produced by a whistle of fixed length depends upon the density of the gas used. We utilize this principle by passing a gas through a whistle to produce a sound wave and by varying the effective length of the whistle to produce a sound wave of predetermined frequency. We determine when this predetermined frequency of sound wave is reached by actually comparing the sound produced with the resonance of a single frequency indicator. By utilizing this principle it is evident that the density of the gas is a function of the length of the whistle taking into consideration the pressure, temperature and ratio of the specific heats of the gas used. It therefore follows that the frequency of the sound wave produced by changing the whistle length gives a measurement as to the length of whistle which is a function of the specific gravity, temperature, pressure and ratio of specific heats of the gas. Therefore, knowing the temperature, pressure and ratio of specific heats of a particular gas, and having determined through the use of our method the effective length of the whistle to produce a given frequency of sound wave, an equation can be written which gives the specific gravity of the gas or a density in terms of these values.

In accordance with actual practice, the operating equation thus determined is used to construct operating curve sheets similar to Figure 6 for the determination of specific gravity of gases from measured whistle lengths and observed gas temperatures when the whistle is sounded at a given frequency of sound wave. A simplified general equation for determining the effective length of the whistle in inches as a function of specific gravity of the gas S, the temperature T of the gas at the whistle in °F., and where K is the ratio of the specific heats of the gas at the temperature T is:

$$S = \frac{aK(460+T)}{520 l^2}$$

where $l$ is the effective length of the whistle in inches.

The specific gravity of the gas is as compared with air of a specific gravity of 1. In this formula $a$ is a constant, depending on gas pressure, whistle construction and desired constant frequency.

In order to fully understand the method of our invention and the apparatus used for carrying out the method, it is believed advisable to first describe the preferred form of apparatus as it is illustrated in the accompanying drawings.

In the drawings I indicates a whistle barrel which is provided with a whistle aperture 1a. The whistle barrel is supported in a supporting sleeve 2 which is secured to a supporting tube 3. The whistle barrel 1 extends through a reduced cylindrical portion of the sleeve 2 and is clamped in position of adjusted length by means of a tube clamp 4. This enables preliminary adjustment of the length of the whistle barrel to determine standard conditions of operation.

In order to determine the effective length of the whistle barrel 1, there is mounted therein a plunger 6 which plunger or piston 6 determines the effective length of the barrel by its position axially of the barrel 1. In order to determine this position with the degree of accuracy required, the plunger 6 has formed thereon a micrometer screw 7 which is threaded through the micrometer barrel 8 and has secured to its outer and a micrometer thimble 9. The micrometer thimble 9 has graduations 9a formed thereon, while corresponding graduations 9b are formed on the outer surface of the barrel 8. It will be observed that the sleeve 3 fits over the supporting tube 5a and forms a sliding fit therewith. A lock screw 5 is provided for locking this adjustment and provides a calibrating lock for locking the parts in the required adjusted position upon calibration of the whistle.

The whistle barrel 1 is connected through a conduit 10 with a cylinder 11 in which there is provided a thermometer reservoir 12 in which the thermometer 13 is positioned for taking the temperature of the gas. The thermometer well 12 is connected to a gas inlet tube 14 in which a gas inlet valve 15 is mounted. Means are provided for controlling and adjusting the pressure of the gas which is used to actuate the whistle. This pressure adjusting means may be of any suitable or desirable construction and is herein illustrated as being of the following construction: A water column 16 is carried by parallel links 17 enabling adjustment of the height of the water column. This water column is connected by means of a rubber hose 18 to a glass tube 19 which glass tube is mounted on the face panel 20 of the instrument and is marked as indicated at 21. This point 21 is the point to which the water meniscus is adjusted when tests are being conducted. Gas pressure is transmitted from the cylinder 11 to the surface of the water within the water column 16 through a flexible hose coupling 22. The gas pressure is thus taken at the gas inlet to the whistle. Any pressure change in system is indicated by the change of height of water in the glass gauge 19 on the front of the panel.

The adjustable vertical lift provided by the parallel links 17 operating through the adjustment handle 23 enables the height of the water column to be moved to the zero pressure position in the gauge glass during calibration and for the reproduction of an exact zero pressure setting during subsequent operation of the instrument. The handle 23 is carried by a screw 24 which is threaded through a block 25 carried by the panel 20 in position to engage a leg 26 carried by one of the parallel links 17.

During an actual test, the source of the sample of gas to be tested is connected by a suitable conduit to conduit connector 15a from which the gas stream passes through the needle valve 15, hence through another conduit and conduit connector 14 to the supported conduit 27, thermometer reservoir 12, cylinder 11 and conduit 10, through which the gas stream enters the whistle 1.

As a preliminary adjustment at the beginning of the test, needle valve 15 is closed so that the pressure within the whistle 1 is atmospheric pressure. The vertical lift water column 16 is then adjusted to bring the water in the gauge glass 19 to the correct zero pressure position, after which and during the entire period of test, the correct pressure and flow of gas from the sample supply is maintained by adjusting needle valve 15 so that the water meniscus coincides at all times during the test with the operating mark 21 on the glass tube 19. With conditions maintained as stated above, the effective length of the whistle 1 is varied by turning micrometer thimble 9 to move piston 6 toward or away from whistle aperture 1a to increase or decrease the effective length of whistle 1 to that length necessary for the whistle 1 to produce a sound wave having a frequency identical to that of resonator 28 as indicated by maximum electric flow through ammeter 31.

The gas temperature, as indicated by thermometer 13, and the effective length of the whistle 1, as indicated by the micrometer reading, are then used to determine the specific gravity of the gas sample from a curve sheet similar to Figure 6 constructed for the type of gas being tested.

The resulting error from the use of incorrect gas pressure is about 1% of the specific gravity of the gas for each one-quarter inch of water pressure variation from the standard operating gauge pressure for the surrounding temperature. The error is positive for pressure less than, and negative for pressures greater than, the standard operating gauge pressure.

Standard operating gauge pressure is variable depending on surrounding temperture. The standard reference gauge pressure used to calibrate the instrument is 2⅜ inches of water for a surrounding temperature of 60° F.

Since the physical characteristics of the resonator 28 and other metal parts of the instrument change slightly with surrounding temperature, it is necessary, if extreme accuracy is required, to provide a means by which the combined effects of these changes on the accuracy of the instrument can be eliminated. This is accomplished by fitting the vertical section of the gauge glass 19 with a scale 29 graduated to indicate zero water pressure positions for surrounding air temperatures from 30° to 100° F. In other words, graduations on this scale have been empirically determined so that the operating pressure can be changed the amount necessary to offset any error in the indicated specific gravity caused by changes in the instrument due to changes in surrounding temperature.

The resonator 28 is constructed of seamless brass tubing and one end is completely closed. It is supported at the closed end by a bracket 30 to which it is attached by use of a rubber insulator which prevents metal to metal contact between the bracket 30 and the resonator 28. The bracket 30 is so dimensioned and attached to the base of the instrument that it supports the resonator 28 in such a manner that the resonator is parallel to and directly beneath the center line of the whistle 1. This resonator is free to vibrate and is set in motion by impulses imparted to it by the whistle 1. The resonator has a natural or definite frequency of vibration. When the sound vibrations set up by the whistle 1 are adjusted to the natural frequency of the resonator 28, a large amplitude of vibration is produced in the resonator and this vibration in turn is used to generate an electric current which in turn is by proper amplification made to actuate an indicating ammeter 31 during the time the frequency of sound wave produced by the whistle and that of the resonator is identical. Accordingly, the constant frequency resonator 28 is operatively connected to a generator 32 which in turn is connected with an amplifying unit 33 which may be of any suitable or desirable design or character. The amplifying unit is in turn connected with the ammeter 31. The generation of current from the constant frequency resonator is effected by causing the metallic plate of the generator to move in the magnetic field generating alternating current. The amplifier, therefore, should include, in addition to the amplifier tubes, a transformer and a rectifier, all as is well understood in the art, to produce a current for the actuation of the sensitive ammeter 31.

As will be apparent from the drawing, Figure 6, the constant frequency resonator 28 has a frequency of 1147 oscillations per second. This particular frequency was chosen as being a frequency which lies within the range of the maximum deviation of the curves of the plotting of the vibrations per second against the length of the whistle as such curves are plotted in Figure 1 of the article which appeared in the periodical "Gas," issue February 1939, pages 17, 18 and 58. Any other appropriate frequency which lies within this region of the maximum deviation in the said curves might be chosen. It will be apparent from these curves that if a resonator is chosen which has a vibration frequency lying outside of this range of the break of the curve, that there will be substantially no accurately measurable difference in whistle length for such ranges of vibration. From the said Figure 1 it will be noted that at both ends of the curve the curves approach parallelism with the ordinate.

The method of our invention therefore involves the determination of the density of a gas by passing the gas under constant pressure through the whistle 1 and of varying the effective length of the whistle until the sound wave is of a frequency corresponding with, or equal to, the natural frequency of the resonator 28. A large amplitude of vibration is produced in the resonator 28 and the ammeter 31 will indicate maximum current flow and any further change, .001″ or .002″ in effective length of the whistle will result in noticeable decrease in amount of electrical energy produced. No current will be generated until the length of the whistle has been adjusted to within a few thousandths of an inch of effective length necessary to produce the correct frequency of the sound wave, at which point the first indication of current flow will be observed, and as the whistle length is brought closer to the correct value, the amount of current generated will increase to reach a maximum only when the length of the whistle is adjusted to produce the sound wave of the same wave length as that of the constant frequency resonator 28.

It is an important fact that the accuracy of the determination utilizing our method does not depend on the production of a predetermined amount of electrical energy but only on whether any further change in the effective length of the whistle causes an increase or decrease in the maximum amount of electrical energy that can be produced under the particular conditions prevailing during the test. This is important because, under these conditions, any change that may occur in the efficiency of the electrical system will have no effect on the accuracy of results, provided that the amount of electrical energy produced is such as to actuate the ammeter through a range sufficient to determine when the maximum current is being generated. The accuracy of determination for low current values depends upon the degree of amplification only.

As an illustrative example of the use of our invention, the following is set forth: The instrument was first calibrated and determination of the constants $a$ and $c$ were then made as follows:

In order to determine the values for the modified equation $$S = \frac{aK(460+T)}{520(m+c)^2}$$

in which modified formula the expression $m+c=l$ in which $m$ is the micrometer reading of the length and $c$ is a constant.

In calibrating the instrument, the zero pressure adjustment for surrounding temperature was made, after which the whistle was sounded at the correct gas pressure with the reference gas having a known specific gravity of, for example, 0.555. The temperature of the gas at the whistle was found to be 80° F. The micrometer was then adjusted to read 0.870 inch. This approximate micrometer setting was chosen to allow for maximum micrometer range for testing gases of high specific gravity and at higher gas temperature. The calibration lock 5 was then released and the whistle barrel 1 was moved over the piston 6 until the ammeter 31 indicated maximum electrical current flow, at which point the whistle barrel 1 was locked securely in position at the lock 5, and the final adjustment made by micrometer adjustment of the position of the piston 6. This resulted in a correct micrometer reading of 0.871 inch for a natural gas having a specific gravity (S) of 0.555 and a test temperature of 80° F. By reference to a table of specific heat of gases, the value of K was determined to be 1.3049 at 80° F.

In order to complete the data necessary for the determination of the constants $a$ and $c$, another value of micrometer reading was determined by micrometer adjustment only while the whistle was being sounded at the correct pressure by a natural gas having a specific gravity of 0.660 and at a test temperature of 80° F. under which conditions the ammeter indicated maximum current flow when the micrometer reading $(m)$ was 0.505 inch. By reference to the table of specific heats, the value of K, the ratio of the specific heats in this gas, was given as 1.2690 at 80° F.

The final determination of the constant $a$ was made by the use of the following formula:

$$c = \sqrt{\frac{aK(460+T)}{520S}} - m$$

Thus two equations were set up for a constant $c$ as follows:

$$c = \sqrt{\frac{1.3049(460+80)a}{520 \times .555}} - .871$$

$$c = \sqrt{\frac{1.2690(460+80)a}{520 \times .660}} - .504$$

By subtracting the latter equation from the first to cancel $c$ and solving the resulting expression, the value of the constant $a$ was found to be $$a = 6.0585$$

Using this value of $a$ in the equations above set forth, $c$ was found to have a value of $c = 2.9741$.

Having determined these constants, the curves for the specific gravity of other gases was determined as is shown in the graph of Figure 6.

Having fully described our invention, it is to be understood that we do not wish to be limited to the details herein set forth, but our invention is of the full scope of the appended claims

We claim:

1. The method of determining the density of a gas which comprises passing a gas under pressure through a whistle to produce a sound wave, subjecting a constant frequency resonator to said sound wave to thereby vibrate said resonator in response to said sound waves, adjusting the length of the whistle so that the sound wave of definite length as compared with the sound wave of said constant frequency resonator is produced, determining when the length of the whistle is of correct length to produce a wave length corresponding exactly to that of the constant frequency resonator by measuring the intensity of the vibrations of the constant frequency resonator, and then determining the density of the gas producing the said vibration in accordance with the equation $$S = \frac{aK(460+T)}{520(m+c)^2}$$

where $m$ is a measurement of the length of the whistle so determined, $c$ is a constant, $a$ is a constant, K is the ratio of specific heats of the gas tested, and T is the temperature of the gas at the whistle in degrees Fahrenheit.

2. In a method of determining the density of a gas, the steps of passing a gas through a whistle, adjusting the length of the whistle to produce a sound wave corresponding in wave length to that of a constant frequency resonator, subjecting said constant frequency resonator to said sound wave to thereby vibrate said resonator in response to said sound waves, and measuring the amplitude of vibrations of the constant frequency resonator to determine when the whistle length is adjusted to produce vibrations corresponding in wave length to that of the constant frequency resonator.

3. In a method of determining the density of a gas from the length of the whistle through which the gas is passed to produce vibrations, the steps of adjusting the whistle length to produce sound vibrations which correspond in wave length to those of a constant frequency resonator, and as an index of the density of the gas determining when the length of the whistle is correctly adjusted by determining the length of said whistle which produces vibrations of maximum intensity in the said constant frequency resonator.

4. In a method of determining the density of a gas, the steps of passing a gas through a whistle to produce a sound wave, impressing the sound wave upon a constant frequency resonator, adjusting the length of the whistle to produce sound waves having a frequency equal to the natural wave length of said resonator, until there exists a maximum intensity of vibration of the constant frequency resonator to determine when the whistle length is adjusted to produce a wave length corresponding to that of the constant frequency resonator.

5. In a method of determining the density of a gas, which includes the steps of passing the gas through a whistle to produce a sound vibration, imposing the sound wave so produced upon a constant frequency resonator to vibrate the same, producing an electrical current from the vibration set up in the constant frequency resonator, and adjusting the length of the whistle to produce a maximum current through the vibration of the said resonator.

6. A method of determining the density of a gas, which includes the steps of passing a gas at a predetermined pressure and known temperature through a whistle to produce a sound wave, imposing the sound wave upon a constant frequency resonator to vibrate the same, producing a current of electricity from the vibrations of the resonator, and adjusting the length of the whistle to produce a maximum current whereby the density of the gas is determined in accordance with the equation $$S = \frac{aK(460+T)}{520(m+c)^2}$$

in which $m$ is a measurement of the length of the whistle in inches, $c$ and $a$ are constants, K is the ratio of specific heats of the gas tested, and T is the temperature of the gas at the whistle in degrees Fahrenheit.

7. In an apparatus for determining the density of the gas, a whistle, means for conducting the gas through the whistle, a constant frequency resonator positioned parallel with the whistle in the range of sound waves emitted from said whistle, means for varying the effective length of the whistle to thereby produce a sound wave corresponding in wave length to that of the constant frequency resonator, and means for measuring the amplitude of vibration set up in the constant frequency resonator by the sound wave produced by the whistle to determine when the whistle length has been adjusted to produce the sound wave having a wave length corresponding with that of the constant frequency resonator.

8. In an apparatus for determining the density of a gas, a whistle, means for varying the effective length of the whistle, means for passing a gas through the whistle to produce a sound wave, a constant frequency resonator positioned parallel with the whistle to induce vibrations in the resonator, means for producing a current from the vibrations of the resonator, means for amplifying the current, and means for measuring the effective length of the whistle when the maximum current is being generated from the vibrations set up in the constant frequency resonator.

9. In an apparatus for determining the density of a gas, a whistle, means for varying the effective length of the whistle. means for passing a gas through a whistle to produce a sound wave, a constant frequency resonator, and means operatively associated with the constant frequency resonator and operating in response to the vibrations set up therein by the sound waves produced by the gas passing through the whistle for determining when the whistle is adjusted to produce a sound wave corresponding in frequency to that of the constant frequency resonator, and means for measuring the effective length of the whistle when so adjusted.

10. In an apparatus for determining the density of a gas, a whistle, means for conducting gas under pressure through the whistle, a constant frequency resonator, means for varying the effective length of the whistle to produce a sound wave to induce a vibration in the resonator, and indicating means operative in accordance with the amplitude of vibrations induced in the resonator arranged to produce a maximum indication only when the effective length of the whistle is adjusted, with said gas flowing therethrough, to emit a frequency of vibration substantially equal to the frequency of said resonator.

11. In an apparatus for determining the density of a gas, a whistle, means for varying the effective length of the whistle, means for passing a gas through the whistle to produce a sound wave, a constant frequency resonator positioned in the sound range of the whistle to induce vibrations in the resonator, means for producing a current from the vibrations of the resonator, means for amplifying the current, and means for measuring the effective length of the whistle when the maximum current is being generated from the vibrations set up in the constant frequency resonator.

DONALD C. HILL.
WILLIAM A. McGLASHEN.

REFERENCES CITED

The following references are of record in the file of this patent:

UNITED STATES PATENTS

| Number | Name | Date |
|---|---|---|
| 611,028 | Brysch | Sept. 20, 1898 |
| 838,494 | Barlow | Dec. 11, 1906 |
| 1,269,599 | Harber et al. | June 18, 1918 |
| 1,528,586 | Tate | Mar. 3, 1925 |
| 1,570,781 | Ruben | Jan. 26, 1926 |
| 2,283,750 | Mikelson | May 19, 1942 |

OTHER REFERENCES

"Use of the Whistle in the Purging of Gas Lines; for Measuring Density and Gas-Air Ratio of Fuel Mixtures," article in Gas magazine, Feb. 1939, pp. 17, 18 and 58.